(12) United States Patent
Baxter et al.

(10) Patent No.: US 10,712,116 B1
(45) Date of Patent: Jul. 14, 2020

(54) FIREARM BODY MOTION DETECTION TRAINING SYSTEM

(71) Applicant: TriggerMaster, Inc., Nolensville, TN (US)

(72) Inventors: Malcom Baxter, Nolensville, TN (US); Steve Cretin, Franklin, TN (US)

(73) Assignee: TRIGGERMASTER, LLC, West Palm Beach, FL (US)

( * ) Notice: Subject to any disclaimer, the term of this patent is extended or adjusted under 35 U.S.C. 154(b) by 0 days.

(21) Appl. No.: 14/827,219

(22) Filed: Aug. 14, 2015

Related U.S. Application Data

(63) Continuation-in-part of application No. 14/331,216, filed on Jul. 14, 2014.

(60) Provisional application No. 62/037,108, filed on Aug. 14, 2014.

(51) Int. Cl.
*F41A 33/00* (2006.01)
*G09B 5/02* (2006.01)

(52) U.S. Cl.
CPC ............ *F41A 33/00* (2013.01); *G09B 5/02* (2013.01)

(58) Field of Classification Search
CPC ................................ F41A 33/00; G09B 5/02
USPC .......................................................... 434/16
See application file for complete search history.

(56) References Cited

U.S. PATENT DOCUMENTS

| | | |
|---|---|---|
| 1,786,614 A | 12/1930 | Howard |
| 2,077,373 A | 4/1937 | Formhals |
| 2,325,599 A | 8/1943 | Fidelman |
| 2,396,017 A | 3/1946 | Martin |
| 2,559,010 A | 7/1951 | Cutler |
| 3,365,975 A | 1/1968 | Hathaway |
| 3,861,069 A | 1/1975 | Heurlen |
| 4,725,235 A | 2/1988 | Schroeder et al. |
| 4,725,978 A | 2/1988 | Fujioka |
| 4,782,336 A | 11/1988 | Bailey |
| 4,913,655 A | 4/1990 | Pinkley et al. |
| 5,316,479 A | 5/1994 | Wong et al. |
| 5,345,214 A | 9/1994 | Tsui |
| 5,453,758 A | 9/1995 | Sato |
| 5,532,476 A | 7/1996 | Mikan |

(Continued)

OTHER PUBLICATIONS

The Encyclopedia of Bullseye Pistol, Trigger Control, Chapter 3: Army Marksmanship Training Guide, http://www.bullseyepistol.com/chapter3.htm, 8 pages, Feb. 23, 2005.

*Primary Examiner* — Robert P Bullington
(74) *Attorney, Agent, or Firm* — Pillsbury Winthrop Shaw Pittman, LLP (57) ABSTRACT

An attachment firearm training device (10) for attachment to a firearm, firearm simulator, or firearm replica having a firearm body (12) includes motion detection hardware to acquire data associated with motion of the firearm body during a dry-firing or live-firing training session. The motion detection hardware includes one or more accelerometers and/or one or more gyroscopes. Other suitable motion detection hardware may also be included. A motion signal representative of actual movement of the firearm body is used to generate one or more motion path lines that are displayed on a display. Each motion path line is representative of the actual motion of the firearm body before a shot, during a shot, during recoil, and/or after recoil so a user may analyze whether desired motion of the firearm body is actually being achieved.

14 Claims, 5 Drawing Sheets

(56) References Cited

U.S. PATENT DOCUMENTS

| | | |
|---|---|---|
| 5,658,238 A | 8/1997 | Suzuki et al. |
| 5,761,954 A | 6/1998 | Dvorak |
| 5,831,596 A | 11/1998 | Marshall et al. |
| 5,847,694 A | 12/1998 | Redford et al. |
| 5,954,507 A | 9/1999 | Rod et al. |
| 6,144,367 A | 11/2000 | Berstis |
| 6,181,327 B1 | 1/2001 | Lin et al. |
| 6,243,077 B1 | 6/2001 | Manara et al. |
| 6,257,893 B1 | 7/2001 | Trabut |
| 6,545,661 B1 | 4/2003 | Goschy |
| 6,672,962 B1 | 1/2004 | Ozaki et al. |
| 6,739,873 B1 | 5/2004 | Rod et al. |
| 6,775,940 B2 | 8/2004 | Dworzan et al. |
| 6,854,975 B2 | 2/2005 | Ranzinger |
| 7,329,127 B2 | 2/2008 | Kendir et al. |
| 7,587,277 B1 | 9/2009 | Wells |
| 7,774,155 B2 | 8/2010 | Sato et al. |
| 7,813,581 B1 | 10/2010 | Fitzpatrick |
| 8,275,544 B1 | 9/2012 | Wells et al. |
| 8,556,628 B1 | 10/2013 | Baxter |
| 2002/0162193 A1 | 11/2002 | Frys |
| 2002/0171625 A1 | 11/2002 | Rothchild |
| 2002/0174588 A1 | 11/2002 | Danner et al. |
| 2002/0186204 A1 | 12/2002 | Kim |
| 2002/0197584 A1* | 12/2002 | Kendir .............. F41G 3/2633 434/21 |
| 2003/0022716 A1 | 1/2003 | Park et al. |
| 2003/0189547 A1 | 10/2003 | Lee et al. |
| 2003/0221684 A1 | 12/2003 | Rice |
| 2005/0014113 A1 | 1/2005 | Fleck et al. |
| 2005/0021282 A1 | 1/2005 | Sammut et al. |
| 2005/0197178 A1 | 9/2005 | Villegas |
| 2006/0005447 A1* | 1/2006 | Lenner .................. F41G 3/06 42/111 |
| 2007/0190495 A1* | 8/2007 | Kendir .............. F41A 33/02 434/21 |
| 2008/0105050 A1 | 5/2008 | Kraetz |
| 2009/0005166 A1 | 1/2009 | Sato |
| 2009/0233768 A1 | 9/2009 | Merzenich et al. |
| 2009/0262074 A1 | 10/2009 | Nasiri et al. |
| 2010/0221685 A1 | 9/2010 | Carter |
| 2011/0118023 A1 | 5/2011 | Fu |
| 2011/0167691 A1 | 7/2011 | Bowman et al. |
| 2012/0183930 A1* | 7/2012 | Dribben ............... F41G 3/26 434/19 |
| 2012/0330182 A1 | 12/2012 | Alberts et al. |
| 2014/0360081 A1* | 12/2014 | Lupher ................ F41G 1/38 42/120 |
| 2016/0033221 A1* | 2/2016 | Schmehl .............. F41A 33/00 42/90 |

* cited by examiner

FIREARM BODY MOTION DETECTION TRAINING SYSTEM

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCE TO RELATED APPLICATIONS

This application is a non-provisional of and claims priority to U.S. Provisional Patent Application Ser. No. 62/037,108 filed Aug. 14, 2014 entitled FIREARM BODY MOTION DETECTION TRAINING SYSTEM, all of which is herein incorporated by reference in its entirety.

BACKGROUND

The present disclosure relates to firearm training and more particularly to devices, systems and methods for use with a firearm, firearm simulator, or a firearm replica, or other shooting devices, for detecting motion of a firearm body during training.

A firearm operator typically provides at least two types of input when operating a firearm. First, the operator generally aims the firearm at a target. Second, the operator typically pulls the firearm trigger using a single finger of the user's hand, thereby activating a firing mechanism in the firearm to discharge one or more projectiles from the firearm barrel toward the target. In some applications, a third type of user input includes applying force to stabilize the firearm to keep the firearm steady before and during the trigger pull, to control recoil, and further to reacquire a target after taking one or more shots.

In many applications, both during training and during live fire of a firearm, it is desirable to maintain a steady orientation of a firearm, firearm simulator or firearm replica to achieve accuracy when firing live or simulated rounds at a target. Thus, users of firearms, firearm simulators and/or firearm replicas, and other shooting devices such as bows, air guns, etc. desire to be able to maintain a steady aim at a target. Steady aim may be achieved by practicing firing a firearm. Conventional diagnostics for training steadiness of aim, recoil control, and target acquisition typically include live firing at a target, and then monitoring accuracy based on observation of target impact locations. However, such conventional diagnostics are typically inadequate for determining steadiness, recoil control, or target acquisition performance because many factors may contribute to variance in impact location on targets, and it is often difficult to correlate target impact location variance with various causes.

What is needed, then are improvements in devices, systems and methods for allowing users to monitor steadiness of a firearm, firearm simulator or firearm replica for training or other purposes.

BRIEF SUMMARY

The present disclosure provides a training system for use on a firearm, firearm simulator, or a firearm replica having a firearm body. The system includes a device used as an attachment that may be installed on the firearm body at an attachment location such as a picatinny rail, on a mounting bracket, on a barrel, receiver, stock, forearm or other attachment location. The device includes motion sensing hardware to detect movement of the firearm body along one or more axes. In some embodiments, the device is configured to detect movement of the firearm body along at least three axes, including pitch, roll and yaw. Additionally, the device may be configured to detect translation of the firearm body along one or more axes.

The device also includes data acquisition hardware to acquire and/or store information associated with the detected motion and/or forces imparted on the device. The data acquisition hardware may be used to generate motion data associated with the detected motion of the firearm body. The motion data may be stored on the device in some embodiments. The stored motion data is representative of detected motion of the firearm body, and particularly of the firearm barrel, in some embodiments. In some embodiments, the data is representative of a path of motion taken by the firearm body, or the firearm barrel, in three-dimensional space. In other embodiments, the stored data is representative of motion of the firearm body, or the firearm barrel, relative to a two-dimensional plane substantially transverse to the longitudinal axis of the firearm barrel. As such, the data is representative of the orientation of the barrel relative to a simulated target plane. The data may be used to map a motion path, simulated impact location, or other indicia on a graph for training a firearm user.

In some embodiments, the present disclosure provides a modular device a user may attach to a firearm, firearm simulator, or firearm replica for training or diagnostics purposes. The device may be attached to an actual firearm in some applications. The assembly of the device and the firearm may be used for training and data acquisition during either live firing or during dry firing. The device detects, tracks, and records data associated with movement of the firearm body and in some instances forces applied on the firearm body during usage.

One object of the present disclosure is to provide a trigger pull training system that allows a user to monitor user input, including the forces, speed, direction, and movement of a firearm body or a firearm barrel during dry or live firing.

Another object of the present disclosure is to provide a trigger pull training system that allows a user to monitor actual barrel displacement during pre-shot, recoil, and post-shot sequences.

Yet another object of the present disclosure is to provide a system that allows a user to record information associated with actual or simulated shots of a firearm and then display that information sequentially or simultaneously on a remote display screen of an electronic device.

Yet another object of the present disclosure is to provide a system that wirelessly transmits information associated with motion of a firearm body or a firearm barrel to an electronic device for storage and/or display.

Yet another object of the present disclosure is to provide a system that stores data on a modular motion detection device and wirelessly transmits information associated with motion of a firearm body or a firearm barrel to a remote electronic device for display.

Yet another object of the present disclosure is to provide a method of training a shooter to improve accuracy, target acquisition, steadiness or other shooting performance considerations by allowing the user to graphically monitor the actual firearm body displacement path in two or more dimensions on a screen of an electronic device as a function of time and/or as a function of position.

Numerous other objects, features and advantages of the present disclosure will be readily apparent to those of skill

DETAILED DESCRIPTION

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

Figure 1:
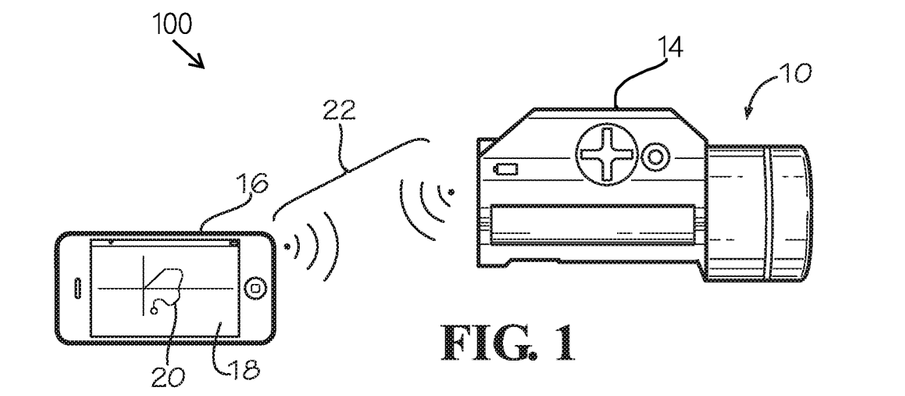
FIG. 1 illustrates a side view of a firearm training device for attachment to a firearm, firearm simulator, or firearm replica for detecting motion.
Figure 2:
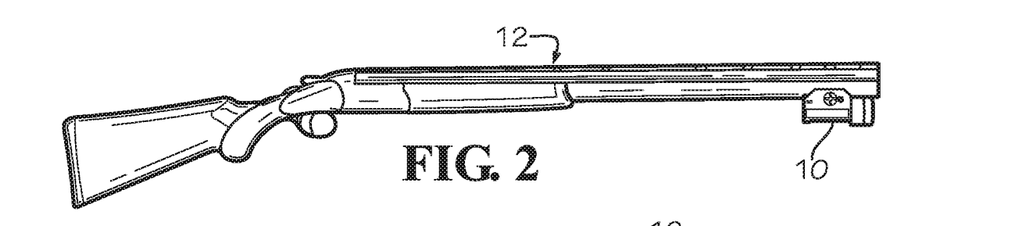
FIG. 2 illustrates a side view of an embodiment of a firearm training device mounted on a shotgun.
Figure 3:
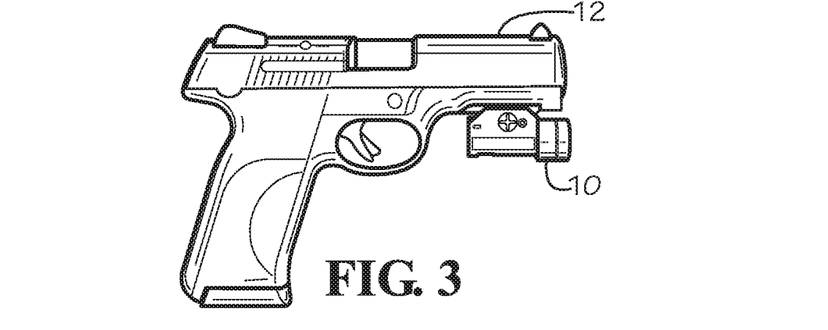
FIG. 3 illustrates a side view of an embodiment of a firearm training device mounted on a handgun.
Figure 4:
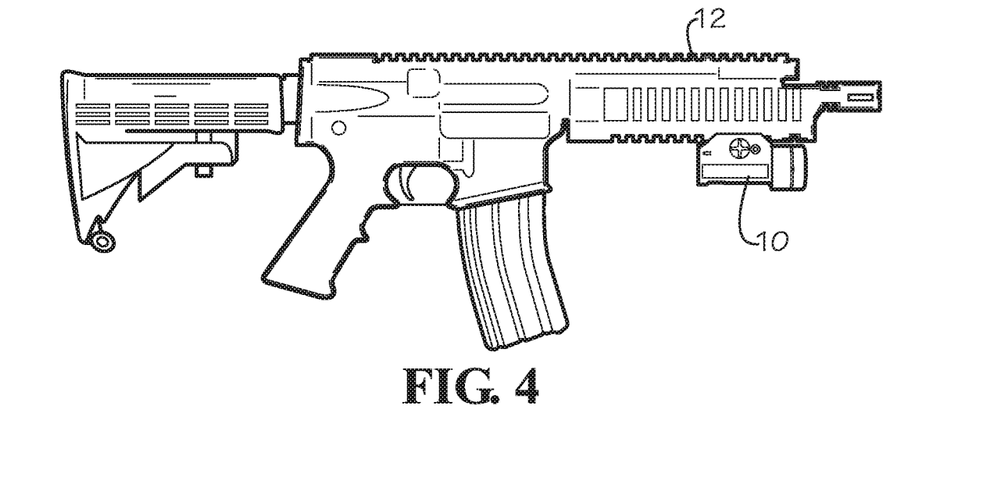
FIG. 4 illustrates a side view of an embodiment of a firearm training device mounted on a rifle.

Referring now to the drawings, FIG. 1 illustrates a side view of an embodiment of a firearm training device for attachment to a firearm, a firearm simulator, or a firearm replica generally designated by the numeral 10. In the drawings, not all reference numbers are included in each drawing for the sake of clarity. In addition, positional terms such as "upper," "lower," "side," "top," "bottom," etc. refer to the apparatus when in the orientation shown in the drawing. The skilled artisan will recognize that the apparatus can assume different orientations when in use. The term firearm body may refer to any structural feature on a firearm, a firearm simulator, or a firearm replica such as a barrel, grip, sight, receiver, stock, magazine, etc.

The firearm training system of the present disclosure generally provides a user the ability to graphically monitor motion of a firearm body before, during and after a live or simulated trigger pull. The training system includes a firearm training device 10 that may be modularly attached to a firearm body 12, such as a shotgun, handgun, rifle or other firearm body. Firearm training device 10 may be attached to an actual firearm, a firearm simulator, or a firearm replica. Firearm training device 10 includes a mounting bracket 14 that may be attached to a corresponding structure on the firearm body 12 such as a picatinny rail, a mounting bracket, a barrel, a grip, a receiver, a magazine or any other structure on the firearm body. As such, firearm training device 10 may be modularly attached to a user's existing firearm, thereby reducing the need to purchase a new firearm, firearm simulator, or firearm replica to perform training using the firearm training device 10.

Referring further to FIG. 1, in some embodiments, the firearm training system 100 includes a firearm training device 10 and a remote electronic display device 16. The electronic display device 16 includes a display screen 18 on which the system 100 displays information related to motion detected by firearm training device 10. The electronic display device 16 includes a receiver that receives data associated with motion of firearm training device 10 via a wireless signal 22. In alternative embodiments, electronic display device 16 may be connected to firearm training device 10 using a data cable. Wireless signal 22 may use any appropriate data transmission protocol such as Bluetooth, Bluetooth low energy, radio frequency, acoustic, optical, or any other suitable wireless data transmission protocol. Data representative of motion of firearm body 12, detected by attachment 10, is received by electronic display device 16, and a graph is generated on display screen 18. One or more indicia 20 representative of motion of firearm body 12, as detected by firearm training device 10, is displayed on the graph on display screen 18.

Data associated with movement of firearm body 12 may be acquired and stored locally on storage media on firearm training device 10. Data transmitted to electronic display device 16 may also be stored remote from firearm training device 10 on storage media on electronic display device 16. Alternatively, data associated with the detected motion of firearm body 12 may be transmitted to a cloud storage location either directly from firearm training device 10 or via wireless signal 22 to electronic display device 16 and subsequently to a cloud storage location. Data associated with motion of the firearm body 12 detected by firearm training device 10 may then be retrieved for viewing or analysis by electronic display device 16 from a cloud storage location without having to re-transmit the data from the firearm training device 10. This allows a user to review and analyze data using electronic display device 16 without having firearm training device 10 present in some applications.

Referring further to FIG. 1, in some embodiments, the modular attachment motion detecting firearm training device 10 includes numerous internal components for sensing motion. Firearm training device 10 may include but is not limited to the following hardware components: one or more gyroscopes, one or more accelerometers, one or more transceivers such as a Bluetooth low energy transceiver, one or more compass devices such as a magnetometer, one or more power supplies such as a disposable or rechargeable battery, and one or more activation devices such as an on/off switch.

Figure 11:
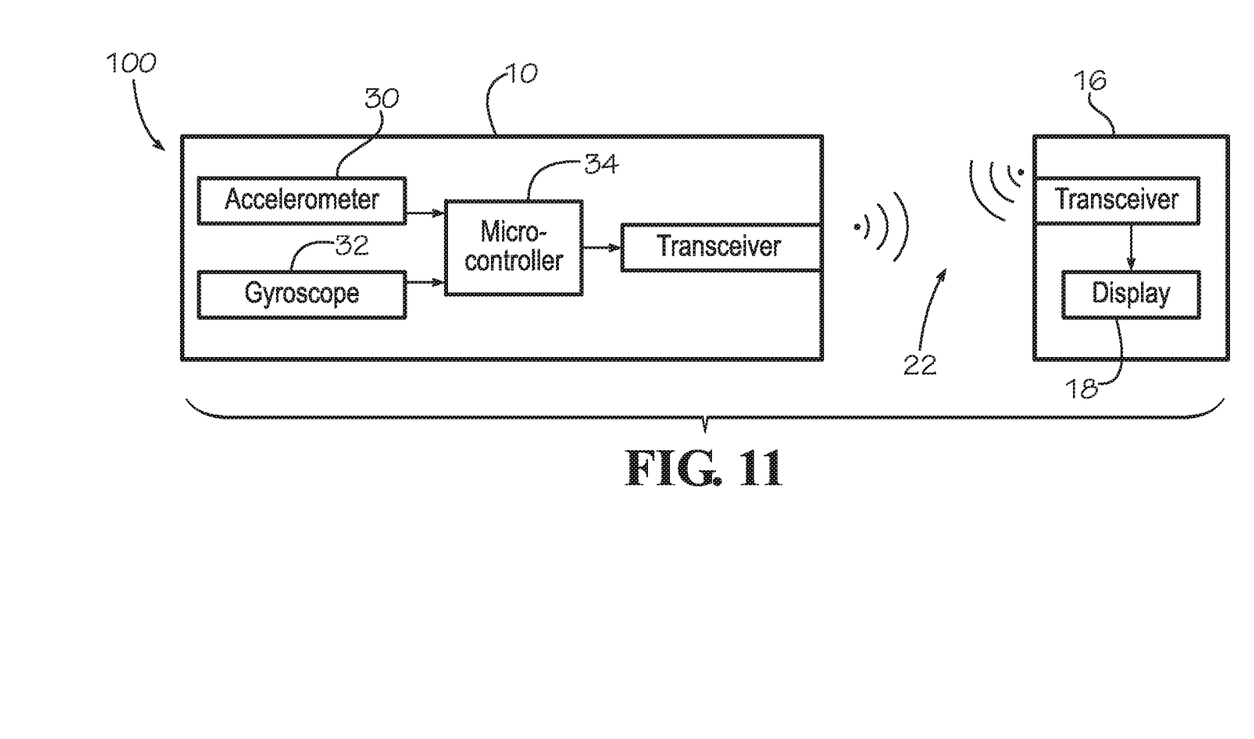
FIG. 11 illustrates a schematic of an embodiment of a firearm training system in accordance with the present disclosure.

As seen in FIG. 11, a firearm training system 100 includes a firearm training device 10 that can be modularly attached and an electronic display device 16. Firearm training device 10 includes an accelerometer 30 and a gyroscope 32. The respective output signals from the accelerometer and gyroscope are input to a microcontroller 34 which instructs a transceiver to communicate with a corresponding transceiver in communication with or positioned on an electronic display device 16 having a display screen 18. Data from the accelerometer and gyroscope are processed to provide a graph on display screen 18 representative of motion of firearm training device 10.

As seen in FIG. 1, electronic display device 16 can include any type of electronic device known in the art for graphically displaying information or for storing information. Electronic display device 16 in some embodiments includes a portable electronic device such as a laptop notebook computer, a cellular phone, a mobile display or a tablet computer.

As seen further in FIG. 1 a motion indicator 20 can also be displayed on a graphical user interface on display screen 18. Motion indicator 20 graphically indicates movement of the firearm body experienced before, during or after a trigger pull, live or dry firing practice, target acquisition or other handling. Motion indicator 20 provides a graphical representation of the direction and the magnitude of the movement of firearm body 12. Motion indicator 20 can be illustrated as a line beginning at a barrel zero position and extending outward along at least two axes. The movement of firearm body 12 represented by barrel displacement indicator 20 can be due to translation along one or more axes, angular rotation (pitch, roll, yaw) about one or more axes, or a superposition of both linear motion and angular rotation about one or more axes. By monitoring the motion before, during and/or after the trigger pull, a user can train to improve accuracy, steadiness, aim, timing, and other performance criteria.

In some applications firearm training device 10 is applied to a firearm body such as a shotgun, handgun or rifle (or simulators or replicas) to track and/or trace acquisition path for acquiring a target. Firearm training device 10 can also be used with a firearm body to track and/or trace kick and associated firearm body motion related to recoil. Firearm training device 10 can also be used with a firearm body to track and/or trace smoothing out demonstrating follow through and/or acquiring one or more subsequent shots after a first shot is fired. This allows the ability of a user to acquire data associated with, store data, and display indicia related to the data for pre-shot and post-shot motion.

Additionally, firearm training device 10 may be used to capture, store and/or display data associated with initial firearm body movement for initial target acquisition, data associated with actual or simulated firing of a shot, data associated with recoil, and data associated with re-acquisition of a target and further shots.

Referring further to FIG. 11, a motion sensing circuit is on a firearm training device 10 in some embodiments. The motion sensing circuit emits a firearm motion signal representative of movement of a firearm body to which the device is attached. The firearm motion signal is generally sent to a microcontroller 34. The firearm motion signal generally includes information related to the translation and/or rotational motion of the device (and the corresponding firearm body attached to the device) before, during and/or after a trigger pull. The firearm motion signal can include numerous components as a function of position and/or time including signals from various hardware components such as accelerometers, gyroscopes, and other motion, position, location, or time detection hardware. Motion signal can be conditioned using a signal conditioning circuit prior to being sent to microcontroller 34 in some embodiments. The firearm motion signal can include an analog voltage signal or a digital signal. The motion sensing circuit is generally configured for detecting and communicating motion of the firearm training device 10 relative to a fixed reference frame such as a gravitational vector. In one embodiment, seen in FIG. 11, a motion sensing circuit on firearm training device 10 includes an accelerometer 30 and a first gyroscope 32. Accelerometer 30 generally emits an accelerometer signal representative of translation motion of firearm body 12, and first gyroscope 32 generally emits a first rotational motion signal, or first gyroscope signal, representative of rotational motion of firearm body 12 about at least one axis.

Accelerometer 30 is generally adapted to detect translation motion of firearm body 12 along at least one axis. For example, during a trigger pull, a user might inadvertently move, or jerk, the firearm body along a first axis, second axis, and/or third axis, thereby causing firearm body 12 to move and affecting the trajectory of a fired shot. By measuring such translation motion of firearm body 12 via firearm training device 10 along at least one axis, a user can monitor barrel movement. In some instances, such translation movement can be associated with an improper trigger pull or other factor. Accelerometer 30 can be a single-axis accelerometer adapted for detecting motion in only one linear direction, a dual-axis accelerometer adapted for detecting motion in two linear directions, or a three-axis accelerometer adapted for detecting motion in three linear directions. In one embodiment, accelerometer 30 includes a model LIS352AX MEM inertial sensor three-axis absolute analog-output accelerometer manufactured by STMicroelectronics of Geneva, Switzerland. Accelerometer 30 emits an accelerometer signal, or translation motion signal. Translation motion signal includes a signal corresponding to linear translation of firearm body along at least one axis. In some embodiments, translation motion signal can sent to a signal conditioner for improving the quality of the translation motion signal. For example, an operational amplifier circuit can be used as a signal conditioner for conditioning translation motion signal. A conditioned translation motion signal can be emitted from the operational amplifier circuit to a microcontroller 34 in some embodiments. Conditioned translation motion signal can be amplified or filtered to remove noise, and can generally include one or more analog voltage signals.

First gyroscope 32 is generally operable to detect rotational motion of firearm body 12 about at least one axis. For example, during a trigger pull, a user might inadvertently move, or jerk, the firearm body 12 in a rotational motion about one or more axes. Such rotational movement of firearm body 12 around any one or more axes can cause the barrel to move, thereby affecting the trajectory of a fired shot. In some embodiments, first gyroscope 32 can include a micro-electromechanical system (MEMS) and can include more than one gyroscope sensor included in a single integrated circuit (IC) package. For example, in one embodiment, first gyroscope 32 includes a model IDG-1150 dual-axis gyroscope manufactured by InvenSense, Inc. of Sunnyvale, Calif. First gyroscope 32 includes two gyroscope sensors integrated on a single chip in some embodiments. In one embodiment, first sensor is adapted to measure rotation of firearm body 12 about the second axis, and second sensor is generally adapted to measure rotation about the first axis. First sensor emits a first sensor signal corresponding to rotation about the second axis, and second sensor emits a second sensor signal corresponding to rotation about the first axis. First and second sensor signals form first rotational signal which includes an analog voltage in some embodiments of first gyroscope 32. In other embodiments, first rotational signal includes a digital output signal.

Referring again to FIG. 11, in some embodiments a communication signal 22 is transmitted to electronic display device 16. Communication signal 22 can include digital or analog signals including information related to trigger position, linear acceleration of firearm body 12, rotational displacement of firearm body 12, barrel displacement along at least two axes, or other information to be displayed on electronic display device 16. Communication signal 22 can include analog output, digital output or both. In some embodiments, communication signal 22 is bidirectional. Communication signal 22 can pass to electronic display device 16 via a wired communication signal path, or via a wireless communication signal path. Wireless signal transmission of communication signal 22 can operate using any type of wireless communication protocol known in the art, such as but not limited to serial or parallel data transmission, TCP/IP communication, radio frequency communication, infrared radiation communication or combinations of these.

Referring to FIG. 11, in some embodiments, firearm training device 10 includes a transmitter, or transceiver. Transceiver in one embodiment includes a radio transmitter for transmitting communication signal 22 to a receiver based on electronic display device 16. In some embodiments, transceiver uses a frequency-hopping spread spectrum data transmission protocol, such as Bluetooth, to send data wirelessly to electronic display device 16 via wireless communication signal 22. Electronic display device 16 includes a corresponding receiver capable of receiving and processing the wireless communication signal 22. In some embodiments, transceiver includes a radio transceiver capable of transmitting and receiving data in the 2.4 GHz industrial, scientific and medical band. Communications circuitry including transceiver can use any suitable communications protocol including low energy Bluetooth, WIFI, 802.11, CDMA, GSM or other cellular or wireless communications protocols. In one embodiment, transceiver includes a model WT11 Class 1 Bluetooth Module manufactured by Bluegiga Technologies of Espoo, Finland. It is understood that other models of transceivers or transmitters operable to use any suitable wireless data transmission protocol may also be attached to firearm body 12 for wirelessly transmitting a communication signal to electronic display device 16.

Referring further to FIG. 11, because Bluetooth devices, including transmitters, receivers and transceivers, exist in many electronics products, firearm training device 10 including a Bluetooth-enabled transceiver can communicate with various devices, including laptop computers, personal digital assistants, mobile cellular handset devices, tablet computers or other Bluetooth-enabled devices. The firearm training device 10 includes a Bluetooth transceiver that can be operated in a discoverable mode. When the firearm training device 10 is within range of a Bluetooth-enabled host, such as a PC or a mobile cellular handset, a connection is initiated by the host. Communication between the Bluetooth-enabled host, i.e. PC or mobile cellular handset, and the transceiver located on firearm training device 10 is bi-directional in some embodiments. Data and status changes are sent from the firearm training device 10 to the host. If controls or inputs are manipulated on the host, the changes are sent from the host to the firearm training device 10. For example, a user may change software settings on the host to adjust the difficulty level. The changed setting will be transmitted from the host to the firearm training device 10 by a bidirectional communication signal 22, as illustrated for example in FIG. 11.

Firearm training device 10 communicates with the host through a virtual serial COM port on the host via the low energy Bluetooth wireless communication protocol in some embodiments. The host can include multiple COM ports, and the proper COM port must be selected for proper data transmission to and from the firearm training device 10. In one embodiment, a graphical user interface (GUI) includes a port icon for selection of the proper COM port. The COM port selection information can be stored on the host and will be automatically chosen when the same firearm device is reconnected in a future session.

Figure 10:
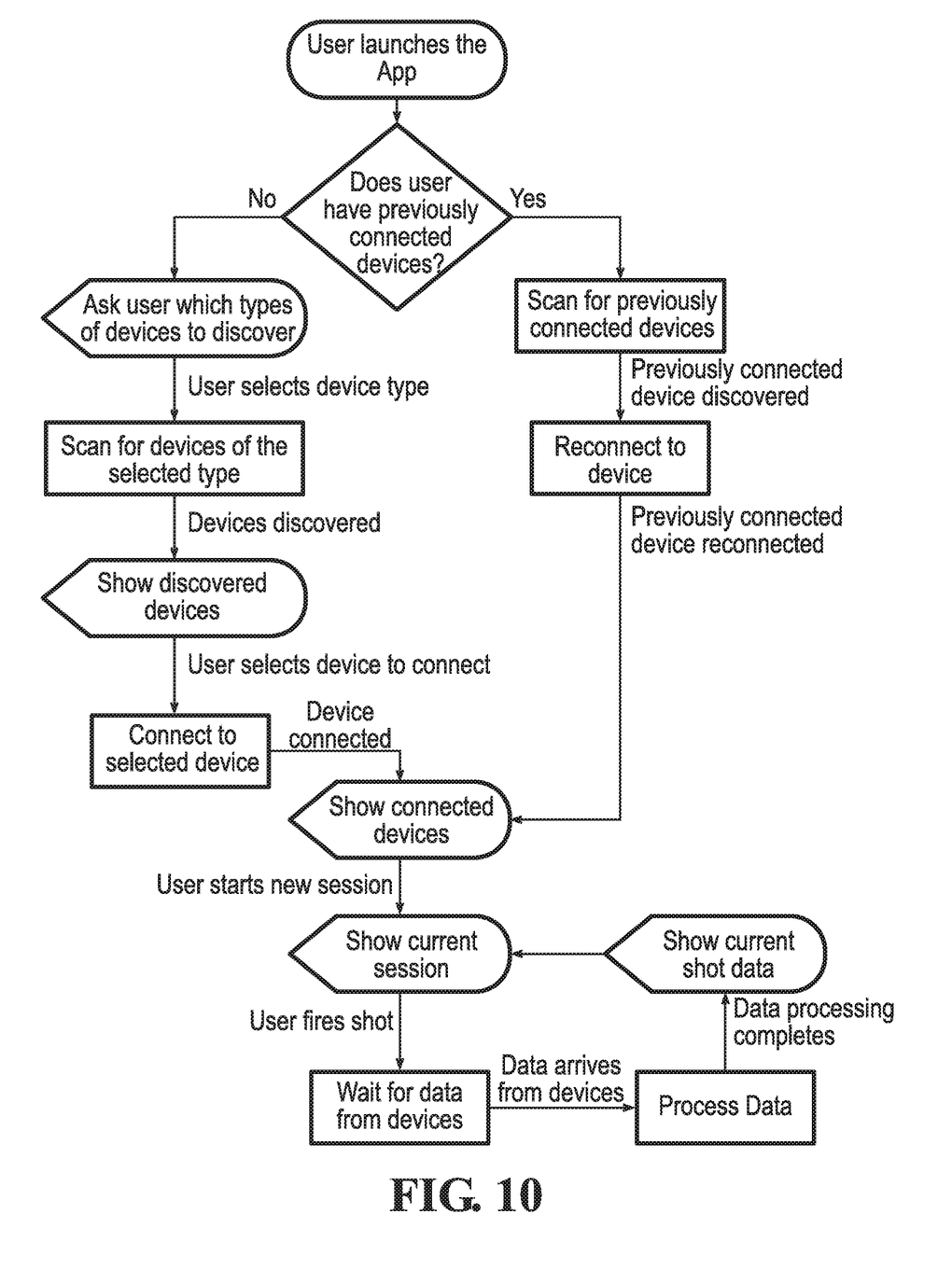
FIG. 10 illustrates a flowchart of a series of steps for performing a method of acquiring information from a firearm training system including a motion detection device such as the firearm training device shown in FIGS. 1-4.

A sample method of operation of firearm training device 10 is shown in FIG. 10. The method includes a first step where a user launches a software app on an electronic display device 16 such as a tablet computer, laptop computer, cellular phone or other suitable device. The software checks to see if the user has previously connected devices. If the result is yes, the software instructs the electronic display device 16 to scan for previously connected devices. If detected the software reconnects to the previously-connected device and the connected device is shown on the graphical user interface on the display. If the user does not have a previously connected device, the software asks the user which types of devices to discover using the appropriate detection protocol. The user selects the device type and the electronic device scans for the devices of the selected type. Upon discovery of a selected device type, the display shows discovered devices, and a user then selects the device to connect. Once connected the connected device is shown.

A user then starts a new session using firearm training device 10. The current session is shown on electronic display device 16. Alternatively, a current session may be started to initiate data acquisition during a training session without displaying information at that time, but data may be stored for later viewing. Data acquisition is initiated on firearm training device 10 using motion detection hardware identified above. The data acquired by firearm training device 10 may be stored locally and/or transmitted to the electronic display device 16 for processing. Data associated with a current live or simulated shot is then either stored or displayed for recognition by the user. The current session may include numerous shots, leading to acquired data for each shot, including motion detected between shots. Information associated with the acquired data may be displayed in real time on the display screen or may be stored and displayed at a later time for off-line review and analysis. As noted above, the data may be stored locally on the firearm training device 10, stored locally on electronic display device 16, or stored in a remote cloud storage location.

Figure 6:
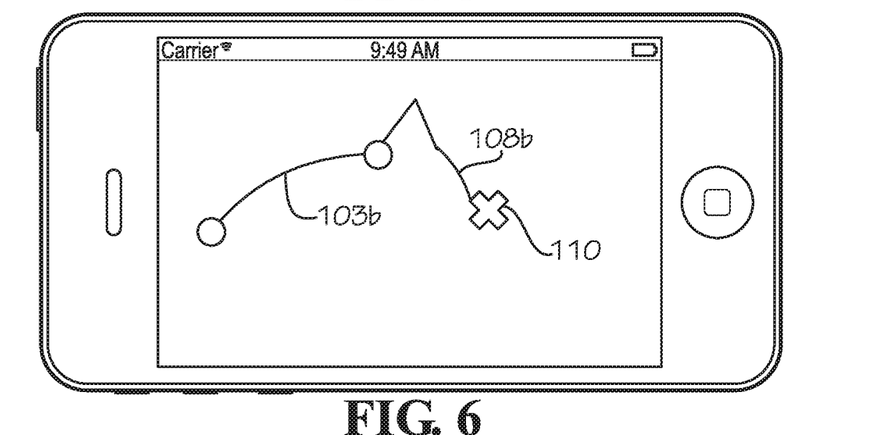
FIG. 6 illustrates an embodiment of a display for use with a firearm training device for displaying firearm body displacement information.

Referring to FIG. 6, an example of motion path displayed on a display is generally shown. The motion path corresponds to motion of a firearm body 12 detected by firearm training device 10 attached to the firearm body. The motion path is derived from data acquired by firearm training device 10 and transmitted to electronic display device 16. The motion path includes a starting point 102 associated with an initial position of firearm body 12 in three-dimensional space, or relative to a simulated two-dimensional target plane. As the user moves the firearm body across a desired path, perhaps to track a flying object with the firearm body, data associated with a pre-shot motion path is stored, and a line representative of the pre-shot motion path 103 may be graphed on a two-dimensional coordinate graph on display screen 18. The pre-shot motion path line 103 corresponds to the data acquired by firearm training device 10 during movement of firearm body. The data may be processed prior to graphing of pre-shot motion path line 103. The graph may include position in a given dimension on the y-axis and time on the x-axis. In other embodiments, the graph includes positions in different dimensions on the x and y axes.

A user may then pull the trigger to initiate a shot, and data is acquired using firearm training device 10 corresponding to the firing. A point representative of a shot position of firearm body 12 is graphed as firing point 104 on display screen 18. Firing point 104 is representative of the physical location where the firearm was fired.

Following firing of the shot, the firearm body 12 experiences actual or simulated recoil in some applications. Motion associated with the recoil of the firearm body 12 is captured using firearm training device 10. The recoil data is used to generate and graph a recoil motion path line 106 representative of the motion of the firearm body during the recoil phase of the shot sequence. The recoil motion path line 106 may be plotted on display screen 18 in a different color, different size, or other different form of indicia to indicate a different stage of the shot sequence in some embodiments.

Figure 5:
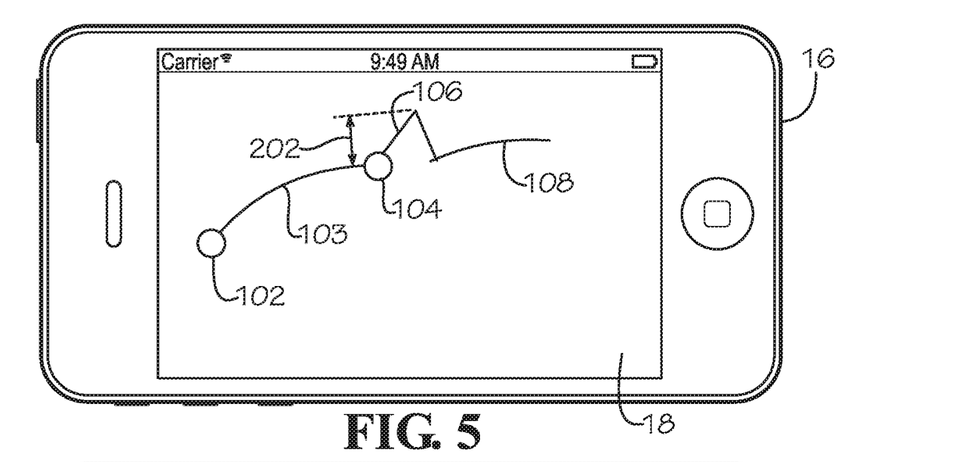
FIG. 5 illustrates an embodiment of a display for use with a firearm training device for displaying firearm body displacement information.

Following the recoil stage, a user may attempt to maintain a steady follow through to improve performance. Follow through is especially important when attempting to shoot at a moving target. Follow through provides a quick recovery from recoil and re-acquisition of a continuation of the original pre-shot motion path line 103. Using the firearm training system of the present disclosure, a user is able to monitor motion of the firearm body 12 to quantitatively measure follow through and to generate a graph on display screen 18 corresponding to the motion of the firearm body to visually determine whether desired follow through is being achieved. A post-recoil path line 108 is graphed on display screen 18, as seen in FIG. 5. Post-recoil path line 108 is associated with data acquired by firearm training device 10 following the recoil stage. As seen in FIG. 5, if the post-recoil path line 108 is within a given set of predetermined parameters, a success indicator or success signal may be communicated to a user or stored.

In some applications, a user may have a tendency to have poor follow through and drop the firearm body or raise the firearm body after the recoil in a position that is not consistent with the continuation of the pre-shot path 102. For example, as seen in FIG. 6, a user may have a post-recoil path 108b that is not a continuation of the pre-shot path line 103b. If the post-recoil path 108b falls outside of a predetermined range of acceptable values, an error indicator or error signal may be communicated to a user or stored. In some embodiments, the error signal includes a graphical error signal 110 displayed on display screen 18.

Another performance goal of shooters may be to try to reduce the impact of recoil on steadiness or accuracy in follow-up shots. To achieve this, users attempt to control the recoil magnitude and/or orientation experienced after firing a shot. The firearm training system of the present disclosure also allows users to train to control recoil effects on follow-up shots and/or follow-up target acquisition.

Figure 7:
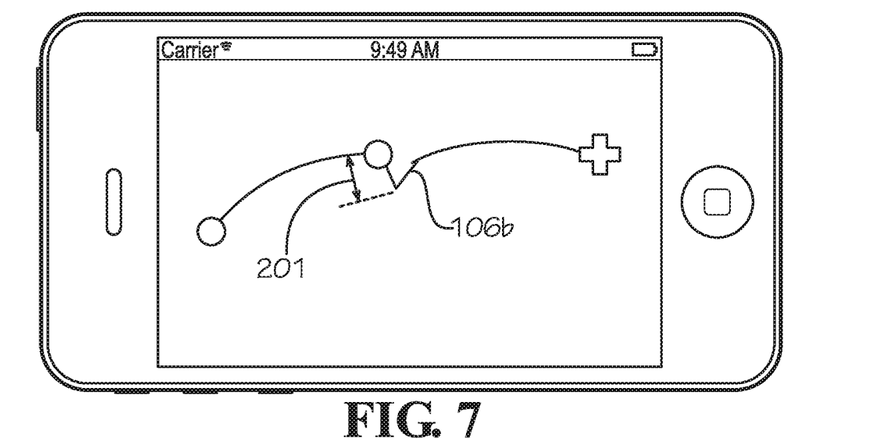
FIG. 7 illustrates an embodiment of a display for use with a firearm training device for displaying firearm body displacement information.

As seen in FIG. 5, a recoil motion path line 106 is representative of both the direction and magnitude of the recoil motion experienced by firearm body 12 during a shot. The recoil motion path line 106 shows a user in which direction the firearm body moved during recoil as well as the approximate scaled distance the firearm body moved during the recoil stage. In some applications, a user may desire to control recoil motion either generally toward the sky or toward the ground. For example, as seen in FIG. 7, the recoil motion path line 106b is oriented downwardly toward the bottom of the display screen 18. The recoil motion path line 106b in this orientation indicates the user moved the firearm body 12 downwardly during the recoil stage. This may be characterized as a good recoil motion, as compared to a bad recoil motion indicated in the recoil motion path line 106 shown in FIG. 5.

Additionally, the maximum distance 201 away from the pre-shot motion path 103 taken by the recoil motion path line 106b in FIG. 7 is less than the maximum distance 202 taken by the recoil motion path line 106 in FIG. 5. This means the shot in FIG. 7 controlled recoil magnitude better than the shot in FIG. 5. By having a lower magnitude recoil distance, a user may be able to re-acquire the desired motion path line for follow-up shots faster. Thus, firearm training device 10 allows acquisition of motion data that may be used to graph both recoil magnitude and recoil direction on electronic display device 16 either in real time or in a later review (from stored data), thereby allowing a user to analyze the graphical feedback to improve firearm device movement during or after training sessions.

In further applications, a user may operate firearm training device 10 to acquire motion data using firearm training device 10 attached to pistol or a rifle. In many applications using a pistol or a rifle, a user desires to aim a firearm body at a target and to maintain steadiness of aim during a firing sequence. Following an initial shot, a firearm body will move due to recoil. A user may desire to re-acquire the target quickly and accurately to fire one or more subsequent shots.

The firearm training device 10 of the present disclosure allows a user to graphically display information associated with motion of a firearm body during a firing sequence. The firearm training system 100 allows a user to graphically display on a two-dimensional coordinate graph firearm body displacement paths representative of the actual motion of the firearm body along one or more dimensions during a firing sequence.

Figure 8:
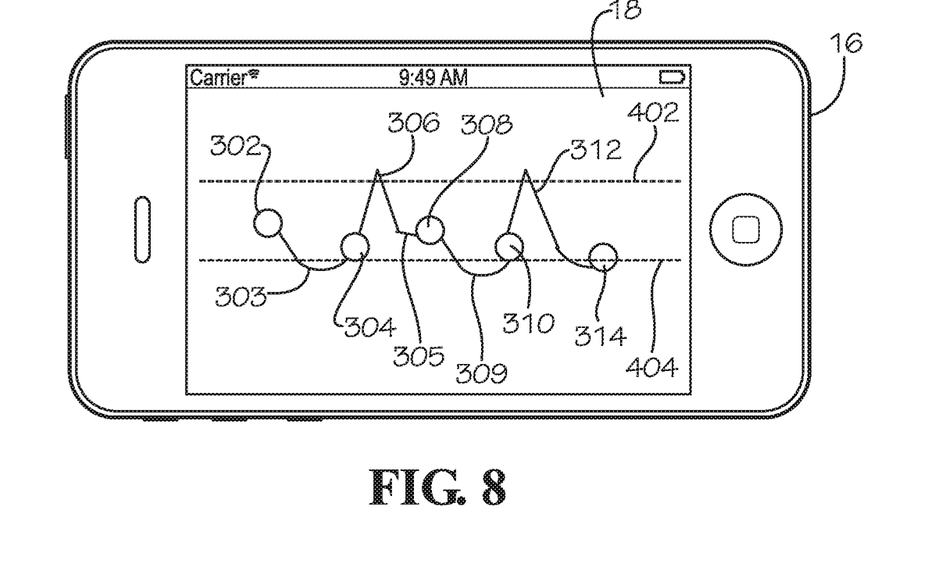
FIG. 8 illustrates an embodiment of a display for use with a firearm training device for displaying firearm body displacement information.

As seen in FIG. 8, a user may attempt a firing sequence directed at a stationary target. An initial target acquisition position 302 is graphed on display screen 18. Initial target acquisition position 302 corresponds to data acquired by firearm training device 10 at the time of an initial data capture command, which may be initiated using any suitable command. For example, the initial data capture command may be a motion-based command whereby a user moves firearm body 12 in a desired pattern, direction, magnitude, or combination to initiate data capture. Alternatively, initial data capture may be initiated by a voice command recognized by an acoustic sensor on firearm training device 10 or by an impact command such as by tapping the firearm body against a surface or a control input by a user's hand. Other suitable initial data capture command protocols and associated software/hardware known in the art may be used with firearm training device 10.

During the firing sequence shown in FIG. 8, a user initial moves the firearm body prior to firing a shot at the shot location 304. The pre-shot displacement line 303 is graphed on display screen 18 representative of the inadvertent (or in some situations intentional) movement of the firearm body 12 prior to firing the shot at the first shot location 304. The pre-shot displacement line 303 is representative of data acquired by firearm training device 10 during this stage of the shot sequence. After firing the first shot, a first recoil signature is plotted in first recoil path line 306. The first recoil path line 306 is representative of the actual path taken by firearm body 12 during the first recoil stage, and this path corresponds to data acquired by firearm training device 10 during the first recoil stage.

Following the first recoil stage, a user attempts to reacquire the target and re-initiate steady aim and fire. A second displacement line 305 following first recoil path line 306 is established to show the user is trying to get back on the target. As second target acquisition position 308 is established and plotted, and a second stage of barrel displacement indicated by a second pre-shot displacement path 309 may be graphed on display screen 18 to show a user how the user is moving firearm body 12 prior to a second shot, indicated by second shot position 310. The second pre-shot displacement path 309 is representative of the motion of the firearm body prior to firing the second shot, indicated by second shot position 310.

A second recoil signature is plotted as a second recoil path line 312. The second recoil path line 312 is representative of the actual path taken by the firearm body 12 during the second recoil stage, and this path corresponds to data acquired by firearm training device 10 during the second recoil stage.

A user may fire a number of shots in a training sequence. Firearm training device 10 may capture data throughout the training sequence to collect pre-shot, recoil, and post-shot information about how a user is moving the firearm body. The data may be processed and displayed on display screen 18 either during real-time or saved for later analysis.

Figure 9:
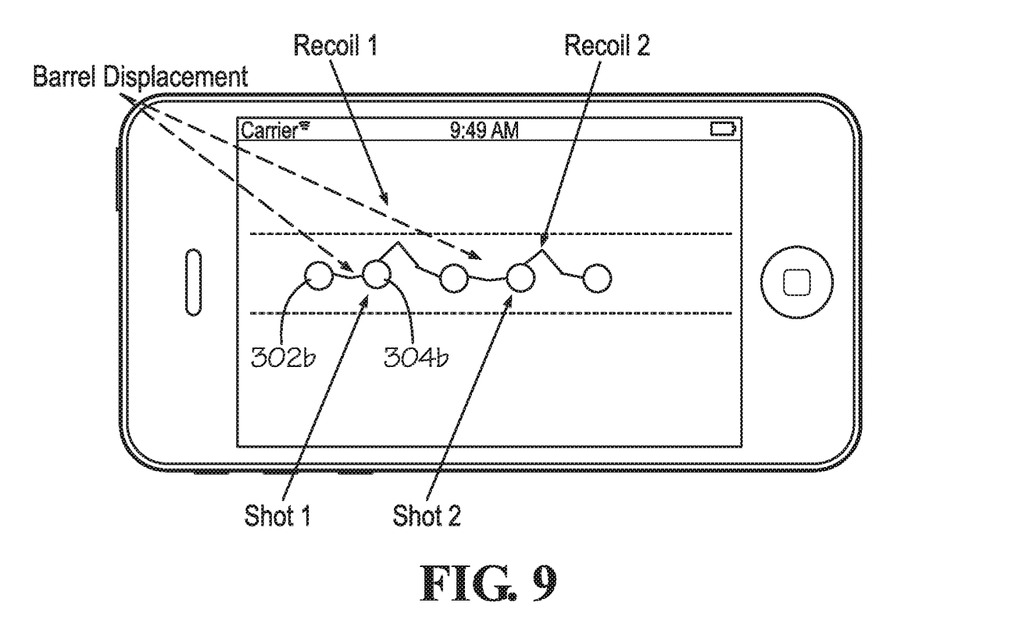
FIG. 9 illustrates an embodiment of a display for use with a firearm training device for displaying firearm body displacement information.

As seen in FIG. 9, a user may attempt to reduce the firearm body movement between initial target acquisition location 302*b* and the firing location 304*b*. By maintaining a steady aim during this period, a more accurate shot is achieved. By graphing displacement information on display screen 18, a user may train to improve performance. Additionally, as seen in FIG. 9, recoil signatures of lower magnitude may be observed so that a user may train to lessen the influence of recoil on follow-up shots.

In some embodiments, one or more boundary lines 402, 404 may be programmed to appear on display screen 18. Each boundary line may correspond to an acceptable performance threshold. For example, an upper boundary line 402 corresponds to an upper threshold for pre-shot and/or post-shot movement. If a user's detected motion in a given dimension exceeds the pre-determined threshold boundary line in either direction, then an error signal or error indicator may be communicated to the user. If the user's movement is within the boundaries, then a success signal or success indicator may be communicated to a user.

In some embodiments, firearm training device 10 stores data onto a computer readable storage medium, such as a flash memory device or the like. In one embodiment, computer readable storage medium includes a removable memory card such as a Secure Digital (SD) format memory card of the type manufactured by SanDisk of Milpitas, Calif. Data associated with one or more trigger pulls and/or barrel displacement data can be stored directly onto the computer readable storage medium. Generally, a data write signal is sent from microcontroller to computer readable storage medium before, during or following a trigger pull. The computer readable storage medium device can then be removed from firearm device and can be attached to a computer or other electronic device for analyzing or graphically displaying the stored information. Additional information can also be stored on computer readable storage medium.

Thus, although there have been described particular embodiments of the present disclosure of a new and useful FIREARM BODY MOTION DETECTION TRAINING SYSTEM, it is not intended that such references be construed as limitations upon the scope of this disclosure except as set forth in the following claims.

What is claimed is:

1. A firearm training system for use with a firearm body, the system comprising:
   a modular device configured for attachment to the firearm body, the modular device comprising:
   a controller,
   one or more sensors operable to acquire data associated with actual firing of a shot from the firearm, and
   a transmitter or transceiver to transmit the data; and
   an electronic display device comprising:
   a corresponding receiver or transceiver to receive the data,
   a display screen to display indicia representative of the data, and
   a processor to process the data and generate the indicia for display on the display screen, wherein the processor processes data acquired by the one or more sensors with respect to detected movement of the firearm associated with the actual firing of multiple shots from the firearm, wherein the data comprises motion data representative of an actual path of the firearm body relative to a simulated two-dimensional target plane over a period of time which includes a shot sequence of a shot of the multiple shots, wherein the processor is configured to process the motion data and generate indicia for display on the display screen comprising a coordinate graph of the motion data including a plot of a motion path line representative of the actual path of the firearm body during the shot sequence, and wherein the motion path line depicts both recoil magnitude and recoil direction of the firearm body in the simulated two-dimensional target plane during the shot sequence, relative to time.

2. The system of claim 1, wherein the one or more sensors comprise at least one accelerometer configured to detect linear motion of the firearm body in at least one linear direction.

3. The system of claim 1, wherein the one or more sensors comprise at least one gyroscope configured to detect rotational motion of the firearm body.

4. The system of claim 1, wherein the one or more sensors comprise at least one accelerometer and at least one gyroscope, the at least one accelerometer configured to detect linear motion of the firearm body, and the at least one gyroscope configured to detect rotational motion of the firearm body.

5. The system of claim 1, wherein the transmitter or transceiver of the modular device is operable to wirelessly transmit the motion data to the receiver or transceiver of the electronic display device.

6. The system of claim 1, wherein the shot sequence comprises a pre-shot target acquisition, shot recoil, and smoothing out of the shot.

7. The system of claim 1, wherein the plot of the motion path line is further representative of the actual path of the firearm body through successive shot sequences of the multiple shots.

8. The system of claim 1, wherein the plot of the motion path line includes a target acquisition position that corresponds to position data acquired by the modular device at a time of an initial motion data capture command.

9. The system of claim 1, wherein the initial motion data capture command is a motion-based command given by movement of the modular device attached to the firearm body, wherein the movement comprises a movement pattern, direction, magnitude, or combination thereof.

10. The system of claim 1, wherein the one or more sensors comprise an acoustic sensor configured to recognize a voice command to initiate capture of the motion data.

11. The system of claim 1, wherein the electronic display device is configured to display on the display screen one or more boundary lines corresponding to an acceptable performance threshold with respect to the motion path line.

12. The system of claim 1, wherein the one or more boundary lines comprise an upper boundary line and a lower boundary line that define upper and lower performance thresholds relative to the motion path line.

13. The system of claim 1, wherein the coordinate graph displayed on the display screen comprises a two-dimensional coordinate graph of the motion data.

14. The system of claim 1, wherein the motion path line representative of the actual path of the firearm body corresponds to motion of the firearm body relative to a two-dimensional plane substantially transverse to a longitudinal axis of a barrel of the firearm body during the shot sequence.

\* \* \* \* \*